Nov. 18, 1958 H. V. THADEN Re. 24,569

CHAIR CONSTRUCTION

Original Filed Feb. 3, 1955 2 Sheets-Sheet 1

INVENTOR
HERBERT V. THADEN,

BY Pierce, Scheffler & Parker
ATTORNEYS

Nov. 18, 1958 H. V. THADEN Re. 24,569

CHAIR CONSTRUCTION

Original Filed Feb. 3, 1955 2 Sheets-Sheet 2

INVENTOR
HERBERT V. THADEN,

BY Pierce, Scheffler & Parker
ATTORNEYS

United States Patent Office

Re. 24,569

Reissued Nov. 18, 1958

24,569

CHAIR CONSTRUCTION

Herbert V. Thaden, High Point, N. C., assignor, by mesne assignments, to Thaden Molding Corporation, High Point, N. C., a corporation of North Carolina Original No. 2,831,534, dated April 22, 1958, Serial No. 485,898, February 3, 1955. Application for reissue May 28, 1958, Serial No. 738,915

8 Claims. (Cl. 155—191)

Matter enclosed in heavy brackets [ ] appears in the original patent but forms no part of this reissue specification; matter printed in italics indicates the additions made by reissue.

This invention relates to a chair construction and to a method of making chairs which are adapted to manual operation for the production of chairs of individual design and in relatively small numbers if desired. This application is a continuation-in-part of my prior application Ser. No. 355,919 filed May 19, 1953, *now Patent No. 2,818,107, granted December 31, 1957.*

An object of the invention is to provide a chair the frame of which, excepting the legs i. e. the parts usually referred to as the seat, back and arms, is unitary and therefore free of joints which may become loose during the life of the chair.

A further object of the invention is to provide a method of making the chair frame or body which is adapted to hand or manual operation, the shape or design of the body being thus readily variable.

A further object of my invention is to provide a method of securing the upholstery cover to the chair whereby the cover readily may be removed and reapplied for the purpose of cleaning or exchange without damage to the cover as when it is secured to the chair frame or body by means of nails or tacks.

Figure 1:
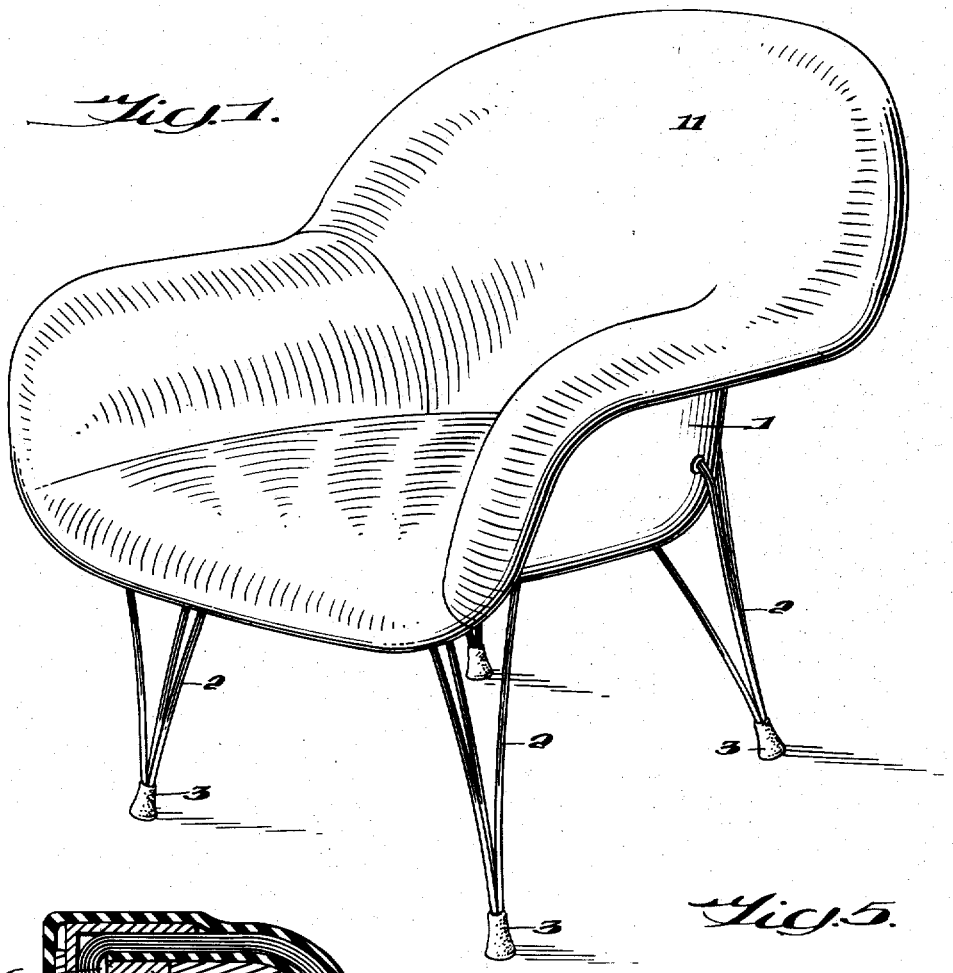
Figure 5:
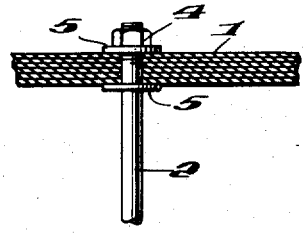
Figure 4:
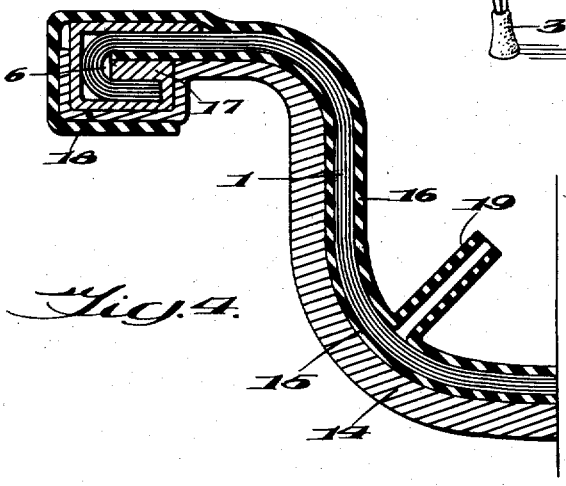
Figure 2:
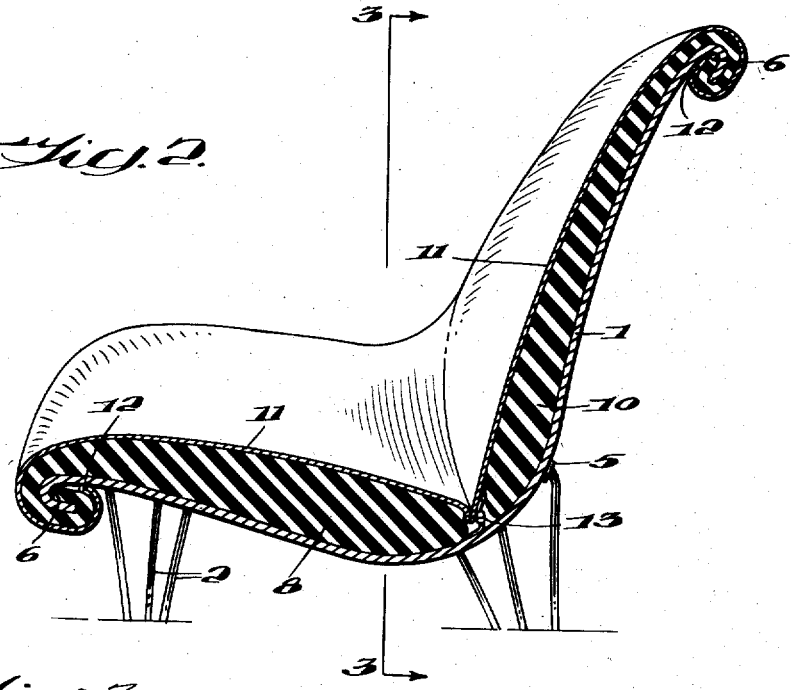
Figure 3:
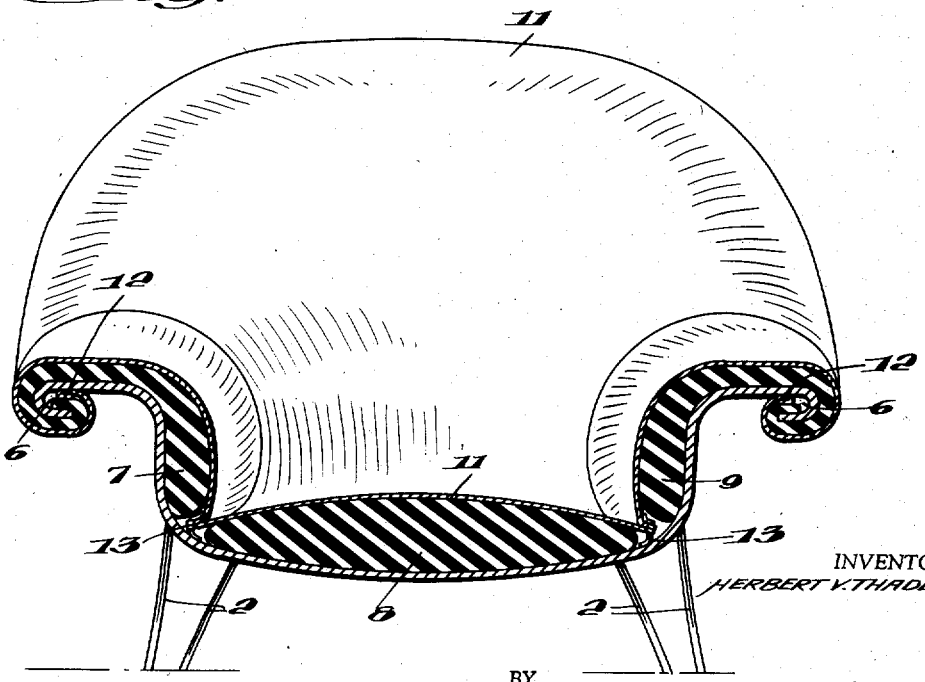

Other objects and advantages of my invention will be described or apparent from the following description of a specific embodiment which is shown by way of illustration in the accompanying drawings in which Fig. 1 is an oblique perspective view of the chair, Fig. 2 is a section through the chair on a plane perpendicular to the floor on which the chair rests and midway between the front and rear legs, Fig. 3 is a section on the line 3—3 of Fig. 2, Fig. 4 is a section extending inwardly from the edge of the chair body illustrating the method of molding the body and Fig. 5 is a section showing how the legs are attached to the body.

Referring to the drawings, 1 is the chair body, which as will be more fully described hereinafter, is molded of a plurality of layers of fabric such as burlap or fibrous mat impregnated with a synthetic resin, preferably a thermosetting resin. 2, 2, 2, 2 are the four legs of the chair, each leg being formed of three metal rods, said rods being secured together at one end, preferably by brazing or welding and the other ends of said three rods being spread apart for attachment to the chair body at separated points. The ends of the rods that are brought together preferably are covered by the rubber feet 3, 3, 3, 3. The spread ends of the rods are bent to extend substantially perpendicularly through the body of the chair depending upon the contour thereof at the points of contact and each end is threaded to receive a nut 4 and a pair of washers 5, 5.

The overall shape of the body 1 is similar to that disclosed in my co-pending application Ser. No. 355,919 filed May 19, 1953, i. e. the back, seat and arms are unitary and the peripheral edge of the seat, arms and back are turned over to form the continuous groove 6 which serves to secure the peripheral edge of the fabric or leather cover and if desired also the peripheral edge of the padding or cushions.

The padding may be any suitable material such as sponge rubber, rubberized hair, kapok or the like and may be secured in place in any suitable way as for instance by being shaped to form cushions 7, 8, 9 and 10 which fit the right arm, the seat, the left arm and the back respectively of the chair. These cushions may be simply laid in placed and held in place by the cover 11 or they may be secured to the body 1 by means of adhesive and as illustrated they may be provided with a relatively thin edge which is secured in the groove 6, this last feature being optional. The cushions may be provided with fabric covers such as muslin and the edges of these covers may be used to secure the cushions in position.

The cover 11 is made of a suitable fabric and preferably is made in four suitably shaped pieces sewn together, i. e. separate pieces for each arm, the seat and the back. The peripheral edges of the cover 11 preferably are formed with a thickened portion i. e. a hem, bead or jam welt 12 designed to fit tightly into the groove 6. The inner edges of the four sections of the cover are secured to the chair body by means of a separable slide fastener 13 which extends rearwardly along the seam between the seat section and one arm section, then laterally along the seam between the seat section and the back section and then forwardly along the seam between the seat section and the other arm section, half of the fastener being secured to the chair frame as by means of adhesive or staples or rivets and the other half being secured to the seat cover along the seam lines described above. Thus if the cover is of the proper shape and size it will be releasably but securely and snugly held on and in the chair by the slide fastener 13 and the jam welt 12. It is preferable generally to secure the half of the separable fastener to the frame through a strip of fabric of suitable width which serves not only to position the fastener at a suitable distance from the frame but gives flexibility to the connection between the frame and the cover.

The jam welt 12 and the groove 6 are so designed that the jam welt 12 may be inserted into and removed from the groove 6 by the fingers alone or with the aid of a blunt tool which will not damage the fabric so that the cover may be removed from the chair, cleaned and returned to the chair or replaced by another cover. This feature of my chair is particularly useful not only for cleaning the cover but also for replacing a worn cover and for replacing one color or design of cover by another. For instance one may wish to replace a cover which is suitable for summer use by a cover which is more suitable for winter use or vice versa.

I shall now describe the structure of the chair frame or base and a simple method of making it. The only tools required are the form or mould 14 which may be made of any suitable rigid material such as wood, plastic or metal, the inner and outer shrouds 15 and 16 and the J strip 17. In making a chair base the shroud 15 is laid upon the form 14 and the J strip 17 which may be a separate strip or integral with the edge of the shroud 15 is positioned in the channel or groove 18 which extends along the peripheral edge of the form 14. The layers of fabric e. g. 4 layers of burlap, impregnated with a heat hardenable synthetic resin are then laid over the shroud 15 with the peripheral edges of the layers of fabric inserted in the J strip 17. The shroud 16 is then laid over the layers of fabric and suction is applied through the nipple 19. Atmospheric pressure on the shroud 16 has been found to be sufficient to hold the layers of fabric tightly together while the resin impregnation is transformed into a thermoset resin by heating. In fact 10 to 12 pounds pressure per square inch has been found to be adequate and such a pressure is readily attainable by means of a simple suction device such as an aspirator or suction pump.

The resin impregnation is hardened by heating in any suitable manner such as by placing the entire assembly in a heated room or oven. After the synthetic resin has been hardened air is admitted through the nipple 19, the shroud 16 is stripped off, the body 1, together with the J-strip 17, are removed from the mold and the J-strip is removed from the body. The body is then in condition for further processing i. e. the installation of the legs 2 and half of the slide fastener 13 and then the padding cushions 7, 8, 9 and 10 and finally the cover 11. After the removal of the body 1 from the mould 14 the latter is ready for the moulding of another body as described above.

A feature of my invention resides in the formation of the body. As stated above I have found that two or more layers of burlap give a body of suitable strength but it is apparent that a different fabric such as a fibrous mat or a different number of layers of fabric may be used or layers of different kinds of fabric may be used. However the outer layer of fabric i. e. the layer adjacent the outer shroud 15 forms the outer visible surface of the arms and back of the chair and should therefore present an attractive appearance. I have found suitably colored or dyed burlap to provide a very attractive appearance for the exterior of the chair. I have found further that in order to give the outer surface of the chair a soft, matte or three dimensional surface, two features are of prime importance (1) the soft and flexible and compressible texture of the shroud 15 (2) the amount and distribution of the synthetic resin in the fabric layers. I have found that proper distribution of the resin can be accomplished by impregnating only the alternate layers of the fabric. For instance when four layers of fabric are used the outer layer and the third layer may be impregnated with 100% of its weight of resin, while the second and fourth layers are not impregnated. When the layers are laid up in the mold and the pressure is applied, the resin in the impregnated layers migrates into the unimpregnated layers giving an adequate amount of resin in the four layers to bind them firmly together into a unitary rigid structure. The amount of resin so supplied is however insufficient to fill the irregularities in the outer surface of the outer layer of fabric and thus produce a smooth outer surface of resin, and as a result the outer surface of the body reveals the texture of the fabric. This method of applying the synthetic resin also facilities the removal of air from the structure when the space between the shrouds is evacuated for the purpose of applying atmospheric pressure to the structure.

The amount of resin to be impregnated into the fabric layers will of course depend to some extent upon the character of the fabric. As stated, 100% by weight of resin in alternate layers of the fabric is satisfactory when burlap is the fabric. A smaller ratio of resin to fabric is required when the fabric is less porous. It would be possible of course to impregnate each layer of fabric with 50% of its weight of resin but this is less convenient in practice than the full impregnation of alternate layers.

The shrouds 15 and 16 may be made of natural or synthetic rubber or any other similar flexible and impervious material such as a rubber-like plastic. Rubber has been found to give excellent results with respect to durability, the texture of the molded body surface and ready separability from the molded body.

I claim:

1. A chair structure comprising a seat portion, arm portions secured to the side edges of the seat portion and extending upwardly therefrom, a back portion secured to the rear edge of the seat portion and extending upwardly therefrom, the front edge of the seat portion, the front and upper edges of the arm portions and the edge of said back portion above said arm portions merging smoothly into each other, said edges having aligned reverse grooves therein to form a continuous groove extending around the periphery of said structure, and a fabric cover covering the seating portion of said chair structure, the peripheral edge of said cover being secured to said structure by means of the continuous groove.

2. A chair structure as defined in claim 1 and further including a cushioning layer intermediate said chair structure and said cover.

3. A chair structure as defined in claim 1 and further including means for securing a portion of said cover to the seat portion of said chair.

4. A chair structure as defined in claim 3 wherein said securing means consists of separable fastening means.

5. A chair structure as defined in claim 4 wherein said separable fastening means is a zipper, one element of said zipper being integral in the upper surface of the chair structure along the joints between the arms and back portion of said chair with the seat portion thereof, and the other zipper element being correspondingly secured to said cover to cooperate with said first zipper element.

6. A chair structure comprising a molded integral body having back, seat and arm portions, the connecting portions thereof being curved and merging into each other with a continuity of strength, each of said portions having aligned reverse integral grooves in the outer surfaces thereof to form a continuous groove extending along the peripheral edge of said body, a flexible cover covering the seating surface of the body, and means for securing said cover to said body comprising a first separable fastener element integrally secured in the seating portion of said body, and a second corresponding separable fastener element on said cover, the peripheral edges of said cover when said separable elements are engaged being inserted in said continuous groove to tension the cover intermediate said separable fastener and said continuous groove.

*7. A chair structure comprising a molded integral body having substantially vertical back and arm portions, the junctions of the front and upper edges of the arm portions and the junctions of the upper edges of the arm portions with the upper peripheral edge of the back portion being curved so that the edges merge smoothly with each other, the external surfaces of said arm and back portions having a continuous reversed groove therein adjacent the front and upper edges of the arm portions and the upper peripheral edge of the back portion, a unitary flexible cover covering the inner surfaces of said arm and back portions, and means securing the lower portion of said cover to the lower portions of said arm and back portions, the upper edges of said cover being inserted in said continuous groove to tension the cover intermediate said securing means and said continuous groove.*

*8. A chair structure comprising a molded integral body having substantially vertical back and arm portions, said back portion partially extending above said arm portions, the front and the upper edges of the arm portions and the upper edge of the back portion merging smoothly to form a continuously curved upper periphery of said body, the external surfaces of said arm and back portions having a continuous reversed groove therein adjacent the front and upper edges of the arm portions and the upper peripheral edge of the back portion, a unitary flexible cover covering the inner surfaces of said arm and back portions, and means securing said cover to said body comprising first separable fastener means integrally secured to the arm and back portions of said body adjacent the lower edges thereof, and corresponding second separable fastener means on said cover adja-*

*cent the lower portion thereof, said second separable fastener means being engaged with said first separable fastener means to secure the lower portion of said cover to said body, the upper edges of said cover being inserted into and held within said continuous groove to tension the cover intermediate said separable fastener and said continuous groove.*

References Cited in the file of this patent or the original patent

UNITED STATES PATENTS

| | | |
|---|---|---|
| 1,853,579 | Sallop | Apr. 12, 1932 |
| 1,917,264 | Kellogg | July 11, 1933 |
| 2,017,178 | Braukhof | Oct. 15, 1935 |
| 2,277,951 | Bloomberg | Mar. 31, 1942 |
| 2,429,122 | Crowley | Oct. 14, 1947 |
| 2,444,394 | Arnold | June 29, 1948 |
| 2,477,697 | Kremer et al. | Aug. 2, 1949 |
| 2,541,835 | Saarinen | Feb. 13, 1951 |
| 2,610,335 | Baptista | Sept. 16, 1952 |
| 2,730,419 | Watrous et al. | Jan. 10, 1956 |